Figures 1, 2:
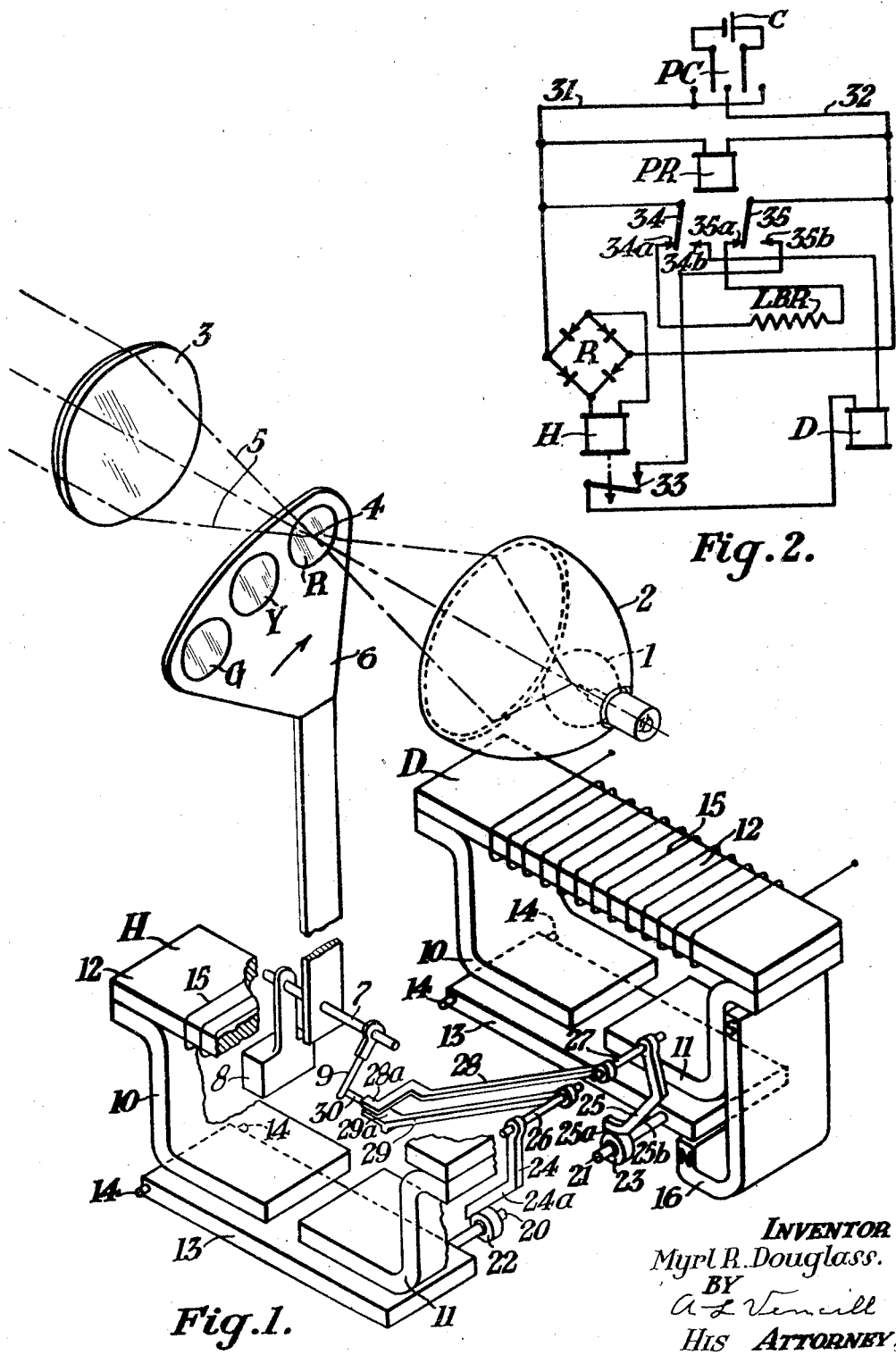

May 3, 1949. M. R. DOUGLASS 2,468,815

LIGHT SIGNAL

Original Filed Jan. 29, 1942

INVENTOR.
Myrl R. Douglass.
BY
HIS ATTORNEY.

Patented May 3, 1949

2,468,815

UNITED STATES PATENT OFFICE 2,468,815

LIGHT SIGNAL

Myrl R. Douglass, Edgewood, Pa., assignor to The Union Switch & Signal Company, Swissvale, Pa., a corporation of Pennsylvania Original application January 29, 1942, Serial No. 428,734. Divided and this application March 27, 1946, Serial No. 657,403

2 Claims. (Cl. 175—335)

My invention relates to light signals, and particularly to light signals which are capable of selectively projecting a plurality of beams of light of different colors from a single light source.

More particularly, my present invention relates to searchlight signals employing a spectacle arm provided with red, yellow and green color filters adapted to be selectively interposed in the signal beam to cause the signal to display stop, approach and clear indications, and a three-position operating mechanism for the spectacle arm provided with two tractive type electromagnets capable of operating the spectacle arm from its approach to its clear position or vice versa without passing through the stop position.

One object of my invention is the provision of novel means for controlling the electromagnets to permit the signal to be operated from a polarized line or track circuit.

According to my invention, a vane carrying the color filters is biased by a counterweight to one extreme position in which the red filter is disposed in the path of the light beam, and is arranged to be moved from this position to the approach and clear positions by means of an arm operatively connected with the vane. This arm cooperates with a first pivoted lever the free end of which overlies a second pivoted lever. The levers are operatively connected with lever cams operated by rollers secured to the armatures of two tractive type electromagnets. The parts are so proportioned that when both electromagnets are deenergized, the spectacle arm is permitted to move to its stop position due to its counterweight bias, when one electromagnet is energized and the other deenergized, the spectacle arm will be moved to its approach position, and when both electromagnets are energized, the spectacle arm will be moved to its clear position.

The two electromagnets are adapted to be energized from a polarized circuit, and the one electromagnet is supplied with energy from this circuit through means which causes the current to always flow in the same direction through said one electromagnet. The other electromagnet is energized over a contact which is closed only when said one electromagnet is energized, and over other contacts which are closed when and only when a polar relay is energized by current of a selected polarity. The polar relay is energized from the polarized circuit.

The present application is a division of my copending application, Serial No. 428,734, filed on January 29, 1942, for Light signals, now Patent No. 2,399,173, granted April 30, 1946.

Other objects and characteristic features of my invention will become apparent as the description proceeds.

I shall describe one form of light signal provided with one control arrangement therefor embodying my invention, and shall then point out the novel features thereof in claims.

In the accompanying drawings, Fig. 1 is an isometric view showing one form of light signal for which the control arrangement embodying my invention is particularly applicable. Fig. 2 is a view showing a control arrangement for the signal shown in Fig. 1, and embodying my invention.

Similar reference characters refer to similar parts in both views.

Referring first to Fig. 1, the signal in the form here shown comprises a suitable optical assembly consisting of an electric lamp 1, a reflector 2, and an objective lens 3 so disposed that the reflector 2 will collect a large percentage of the rays of light emitted by the lamp 1 and will cause them to converge at a focal point 4, and then diverge in order to cover the surface of the objective lens 3 as indicated by the dot and dash lines 5. The various parts of the optical assembly are all of well-known construction, and are illustrated in the drawing in diagrammatic form in order to simplify the disclosure.

Associated with the optical assembly is a spectacle arm 6, the upper end of which is provided with three differently colored screens or filters R, Y and G. The spectacle arm is secured at its lower end to a pivoted shaft 7, and is capable of being moved from a stop position in which the filter R is interposed in the path of the light rays adjacent the focal point 4, to an approach position in which the filter Y is interposed in the path of the light rays adjacent the focal point 4, and a clear position in which the filter G is interposed in the path of the light rays adjacent the focal point 4. It will be apparent that when one of the filters is located in the path of the light rays, the light rays will pass through the filter so that only the light rays of the color which are not filtered out can emerge from the signal. Since the filters are differently colored, it follows that the signal is capable of displaying three different aspects depending upon which of the color filters is disposed at the focal point 4. In the practical application of a light signal embodying my invention to railway signaling, the spectacle arm is biased by its own weight, and by the weight of a counterweight 8 which is secured to the shaft 7, to the stop position, and the filter R is colored red so that when the spectacle arm occupies its stop position, the projected beam will be red indicating "stop." Furthermore, the filter Y is colored yellow and the filter G is colored green so that when the arm occupies its approach position, the signal will be yellow, indicating "approach," and when the arm occupies its clear position, the beam will be green, indicating "clear."

The spectacle arm is arranged to be moved from its stop to its approach and clear positions by means of three-position operating mechanism forming the subject matter of my copending application, Serial No. 428,734, which mechanism I shall now describe. As here shown, this mechanism comprises two electromagnets H and D which I shall term for convenience home and distant electromagnets. The two electromagnets H and D are of well-known construction, and each comprises a pair of magnetizable pole pieces 10 and 11 connected together at one end by a magnetizable backstrap 12, and cooperating at their opposite ends with a tractive type armature 13 pivotally mounted at 14 for swinging movement toward and away from the pole pieces 10 and 11. Each backstrap 12 is provided with an energizing winding 15.

Associated with the distant magnet D is an L-shaped permanent magnet 16 which is secured at its upper end to the pole piece 11, and the lower end of which extends underneath the associated armature 13 opposite the pole face of its pole piece 11 in such manner that when the armature is swung away from the pole pieces 10 and 11, it will be swung toward its permanent magnet and vice versa.

Assuming that the lower end of the permanent magnet 16 is a north pole and the upper end a south pole, as indicated by the letters N and S in the drawing, when the winding 15 of electromagnet D is deenergized, the associated armature 13 will drop under the influence of gravity to the position shown, and under these conditions a part of the flux from the permanent magnet will pass lengthwise through the armature and will exert a torque on the armature which assists the pull of gravity in holding the armature in its lowermost position. When, however, the winding 15 is energized in such manner that the pole piece 11 becomes a south pole and the pole piece 10 a north pole, the permanent magnet and the electromagnet fluxes will buck each other in the armature 13, and as the electromagnet flux builds up in the armature, a point will be reached at which the upward pull exerted on the armature by this flux will exceed the downward pull due to the permanent magnet flux and the force of gravity. When this happens, the armature 13 will swing toward the pole pieces 10 and 11 to its upper or attracted position.

If, when the armature 13 of electromagnet D occupies its released position, the winding 15 is energized in such a direction that the pole piece 11 becomes a north pole and the pole piece 10 becomes a south pole, the flux due to the electromagnet and the permanent magnet will then thread the armature 13 in the same direction, and under these conditions, the armature 13 will remain in the position shown even though the energization of the winding 15 is increased to many times its normal value.

If the polarity of the permanent magnet 16 is reversed from that shown in the drawing, the electromagnet D will operate in a manner similar to that just described except for the fact that the polarity of the current which must be supplied to the winding 15 to cause the armature 13 to pick up will be reversed.

The home magnet H operates in the usual and well-known manner. That is to say, its armature 13 will be picked up or released according as its energizing winding 15 is energized or deenergized.

Attached to the armatures 13 of the home and distant electromagnets H and D adjacent their free ends are laterally projecting pins 20 and 21 which align axially when the armatures are both picked up or both released, and mounted on these pins are rollers 22 and 23. These rollers cooperate, respectively, with lever cams 24 and 25 fixed to axially aligned pivoted shafts 26 and 27. Also fixed to the shaft 27 is an arm 28, the free end 28a of which is offset laterally and overlies an upwardly offset portion 29a formed on the free end of an arm 29 fixed to the shaft 26. A forwardly projecting pin 30 is secured to the offset end 28a of the arm 28, and this pin cooperates with the underside of a downwardly inclined radially extending arm 9 fixed to the shaft 7 which supports the spectacle arm 6.

The arm 29 due to its weight acts to maintain the cam surface 24a of the cam arm 24 in constant engagement with the roller 22, and it will be apparent, therefore, that the arm 29 will be moved to an upper position, or will drop by gravity to a lowermost position according as armature 13 of electromagnet H is picked up or released. The lever cam 25 is provided at its lower end with a rounded cam surface 25a which merges into an inclined cam surface 25b. The rounded cam surface 25a defines an arc whose center of curvature coincides with the axis of rotation of the shaft 27, and whose radius of curvature is just slightly less than the distance from the axis of rotation of the shaft 27 to the nearest point on the roller 23 when the armature 13 of electromagnet D is released. It will be seen, therefore, that when the armature 13 of electromagnet D is released, both cam surfaces 25a and 25b of lever cam 25 will remain out of engagement with roller 23, and that under these conditions arm 28 will follow the movements of arm 29. The length of cam surface 25a is such, and the parts are so proportioned that this cam surface will overlie roller 23, and will act as a mechanical lock to prevent armature 13 of electromagnet D from picking up, except when arm 28 is moved upwardly by arm 29 to the position corresponding to the upper position of arm 29, which position of arm 28 I shall term its "intermediate" position. The parts are further so proportioned that if electromagnet D becomes energized when arm 28 has been moved to its intermediate position, the roller 23 will cooperate with the cam surface 25b to move the arm 28 to an upper position. The pin 30 carried by arm 28 cooperates with the arm 9 secured to shaft 7 in such manner that the spectacle arm will be free to move due to its bias to its stop position when the arm 28 occupies its lowermost position, but that when this arm is moved to its intermediate position, the spectacle arm will be moved to its approach position, and that, when this arm is moved to its upper position, the spectacle arm will then be moved to its clear position. It will be seen, therefore, that when both electromagnets are deenergized, the spectacle arm will be held in its stop position due to its gravity bias, when the electromagnet H is energized and the electromagnet D is deenergized, the spectacle arm will be moved to its approach position, and when the electromagnets H and D are both energized, the spectacle arm will be moved to its clear position.

It will be understood that in actual practice the armatures 13 of the electromagnets H and D will each control contacts not shown in the usual and well-known manner. One of these contacts 33 which is controlled by the home electromagnet H is shown diagrammatically in Fig. 2 as will appear hereinafter.

Referring now to Fig. 2, I have here shown a wiring arrangement for the signal shown in Fig. 1 to enable it to be controlled over a polarized control circuit. As here illustrated, the polarized control circuit comprises two conductors 31 and 32 connected to a battery C over a pole changer PC which may either be operated manually or may comprise the contacts of a relay. The winding of the home electromagnet H is connected with the conductors 31 and 32 through suitable means, here shown as a full wave rectifier R, which means will cause it to be supplied with current of the same polarity whenever the line wires are supplied with current of either polarity. The home magnet is preferably made slow releasing by winding the energizing winding 15 on a copper sleeve, in accordance with well-known practice, and this fact coupled with the fact that the asymmetric units of the rectifier R provide a low resistance shunt path around the winding for currents induced by the decaying flux in the core of the magnet, cause the home magnet to retain its armature closed while the polarity of the line circuit is being reversed under normal operating conditions.

The winding of the distant magnet D is connected with the line wires 31 and 32 over a front contact 33 of the home magnet H and over reverse contacts 34—34b and 35—35b of a polar relay PR which latter is connected directly with the lines wires 31 and 32. The polar relay PR is so constructed that it will close its reverse contacts 34—34b and 35—35b to complete the circuit for electromagnet D when and only when the line wires are supplied with current of the polarity to which the electromagnet D will respond, which polarity I shall term for convenience reverse polarity.

Associated with relay PR is a load balancing resistor LBR which has the same resistance as the winding of electromagnet D, and which is connected with the line wires 31 and 32 over normal contacts 34—34a and 35—35a of electromagnet PR to cause the line to have the same load when the distant magnet is deenergized that it has when this magnet is energized.

With the circuit arranged in this manner it will be apparent that when the line wires are deenergized, the home and distant magnets will both be deenergized and the signal will then display its stop aspect. When, however, the line circuit is supplied with current of normal polarity, the home magnet will become energized and the distant magnet will remain deenergized to cause the signal to display its caution aspect, and when the line circuit is supplied with current of reverse polarity, both the home and distant magnets will become energized to cause the signal to display its clear aspect.

It should be particularly pointed out that with the control circuit constructed in the manner just described electromagnet D is prevented from picking up except when the line wires are supplied with current of the proper polarity, for two reasons. In the first place, the contacts 34—34b and 35—35b of relay PR act to cut off energy from the electromagnet D unless the line circuit is supplied with current of reverse polarity, and in the second place, magnet 16 is effective to prevent armature 13 of electromagnet D from picking up except when winding 15 is supplied with current of reverse polarity.

It should also be particularly pointed out that contact 33 of the home magnet H cuts off energy from the distant magnet D unless the home magnet is picked up. Moreover, this contact offers a delay factor to allow the home magnet H to pick up ahead of the distant magnet D in the event reverse energy is applied to the line wires 31 and 32 without normal energy having first been applied to these line wires. This delay factor permits the relay PR to assume its normal position when the home magnet only becomes picked up should the entire unit have previously been deenergized with the polar relay PR in the reverse position, thus eliminating the possibility of momentary energy being supplied to the distant magnet D under conditions when it should be deenergized. The magnetic bias provided by the permanent magnet 16 for the armature 13 of electromagnet D is probably sufficient to take care of this condition, but contact 33 offers an additional factor of safety.

The wiring arrangement just described provides adequate safety features and satisfactorily meets all safety standards. Should the operating unit become deenergized, the signal will immediately assume its most restrictive aspect. If the armature of the home electromagnet should be dropped to its released position for any reason, the distant electromagnet is automatically deenergized. If any leg of rectifier R breaks down, the worst condition that can happen is a short circuit of the home electromagnet H which will deenergize the distant electromagnet due to the opening of the contact 33 of the home electromagnet, and the signal will therefore display its stop aspect. The signal can be operated from a polarized line or track relay without intermediate relays. Contacts can be added which will permit control of other functions and to permit pole changing of the circuits for the signal next in rear.

Although I have herein shown and described only one form of light signal embodying my invention, it is understood that various changes and modifications may be made therein within the scope of the appended claims without departing from the spirit and scope of my invention.

Having thus described my invention, what I claim is:

1. An electroresponsive device comprising first and second electromagnets controlling first and second pivoted armatures which are adapted to pick up when the associated electromagnet is energized, magnetic means associated with said second pivoted armature for preventing it from picking up except when said second electromagnet is supplied with current of a particular polarity, a member movable from a first position to second and third positions, means operatively connecting said first armature with said member to move said member from its first to its second position in response to movement of said first armature from its released to its attracted position, means operatively connecting said second armature with said member to move said member from its second to its third position in response to movement of said second armature from its released to its attracted position, mechanical means associated with said second armature to prevent it from picking up unless said first armature is picked up, means including a source of current of reversible polarity for energizing said first electromagnet, and means including a contact controlled by said first armature and closed only when said first armature is picked up for supplying current from said source to said second electromagnet.

2. An electroresponsive device comprising first and second electromagnets controlling first and second pivoted armatures, magnetic means associated with said second pivoted armature for preventing it from picking up except when said second electromagnet is supplied with current of a particular polarity, a member biased to a first position and movable to second and third positions, means operatively connecting said first armature with said member to move said member from its first to its second position in response to movement of said first armature from its released to its attracted position, means operatively connecting said second armature with said member to move said member from its second to its third position in response to movement of said second armature from its released to its attracted position, mechanical means associated with said second armature to prevent it from picking up unless said first armature is picked up, a pair of conductors which are at times supplied with current of one relative polarity and at other times with current of the other relative polarity, a polar relay connected with said conductors, means including a full wave rectifier for connecting said first magnet with said conductors, and means including a contact which is closed only when said first armature is picked up and contacts of said polar relay closed only when said polar relay is supplied with current of the polarity which when supplied to said second electromagnet will cause said second armature to move to its attracted position for connecting said second electromagnet with said conductors.

MYRL R. DOUGLASS.

No references cited.